(12) United States Patent
Sysoev et al.

(10) Patent No.: US 10,985,981 B2
(45) Date of Patent: Apr. 20, 2021

(54) MULTI-THREADED SERVER ARCHITECTURE SUPPORTING DYNAMIC RECONFIGURATION

(71) Applicant: NGINX, Inc., San Francisco, CA (US)

(72) Inventors: Igor Sysoev, Moscow (RU); Valentin Bartenev, Moscow (RU); Nikolay Shadrin, San Francisco, CA (US); Maxim Romanov, Moscow (RU)

(73) Assignee: F5 NETWORKS, INC., Seattle, WA (US)

( * ) Notice: Subject to any disclaimer, the term of this patent is extended or adjusted under 35 U.S.C. 154(b) by 609 days.

(21) Appl. No.: 15/695,729

(22) Filed: Sep. 5, 2017

(65) Prior Publication Data

US 2019/0075024 A1 Mar. 7, 2019

(51) Int. Cl.
*H04L 12/24* (2006.01)
*H04L 29/08* (2006.01)
*H04L 29/06* (2006.01)

(52) U.S. Cl.
CPC ...... *H04L 41/0816* (2013.01); *H04L 41/0866* (2013.01); *H04L 67/02* (2013.01); *H04L 67/1008* (2013.01); *H04L 67/28* (2013.01); *H04L 67/42* (2013.01)

(58) Field of Classification Search
CPC . H04L 41/0816; H04L 67/42; H04L 41/0866; H04L 67/34; H04L 67/28; H04L 67/1008; H04L 67/02; H04L 29/06; H04L 67/14; H04L 67/142; G06F 9/44505; G06F 2209/5017
See application file for complete search history.

(56) References Cited

U.S. PATENT DOCUMENTS

2002/0120724 A1* 8/2002 Kaiser ................. H04L 41/0816
709/221
2003/0101245 A1* 5/2003 Srinivasan .......... G06F 9/44505
709/221

* cited by examiner

Primary Examiner — Muhammad Raza
(74) Attorney, Agent, or Firm — Troutman Pepper Hamilton Sanders LLP (Rochester)

(57) ABSTRACT

A server is dynamically reconfigured by storing a plurality of server configurations in a configuration store. Requests, received by the server, are routed to one of a plurality of workers for processing the requests. Each request is associated with a current configuration of the plurality of configurations that a worker uses to process the request. The number of workers using each configuration of the plurality of configurations is counted. Responsive to the counting, it is determined that a prior configuration of the plurality of configurations is not being used by the workers. The prior configuration is deleted from the configuration store responsive to the determination that the prior configuration is not being used.

18 Claims, 5 Drawing Sheets

MULTI-THREADED SERVER ARCHITECTURE SUPPORTING DYNAMIC RECONFIGURATION

BACKGROUND

1. Field of the Invention

This invention pertains in general to web server architectures and in particular to a multi-threaded server architecture supporting dynamic reconfiguration.

2. Description of the Related Art

A traditional web server architecture has a configuration that describes characteristics of the web server. The web server configuration can dynamically change when, for example, hardware or software associated with the web server changes. In addition, the web server includes one or more web applications for processing requests for resources according to the web server's current configuration. A web application can process multiple requests simultaneously and the amount of time required for the web application to process a given request can vary depending upon the type of requests and other characteristics.

When the web server configuration changes, newly-received resource requests cannot be assigned to existing instances of the web applications because the applications are processing requests according to the previous configuration. Therefore, the web server must instantiate new web applications for processing requests using the new current configuration of the server. In addition, the web server must maintain the old web applications while the applications process requests made under the old configuration.

It is computationally inefficient to maintain two or more sets of web applications for processing resource requests under different configurations. Each set of web applications occupies memory and other resources of the web server. Therefore, the performance of the web server is impacted due to the dynamic reconfigurations.

SUMMARY

The above and other needs are met by methods, computer-readable storage media, and systems for providing dynamic reconfiguration of a multi-threaded server architecture.

One aspect provides a computer-implemented method for dynamically reconfiguring a server by storing a plurality of server configurations in a configuration store. Requests, received by the server, are routed to one of a plurality of workers for processing the requests. Each request is associated with a current configuration of the plurality of configurations that a worker uses to process the request. The number of workers using each configuration of the plurality of configurations is counted. Responsive to the counting, it is determined that a prior configuration of the plurality of configurations is not being used by the workers. The prior configuration is deleted from the configuration store responsive to the determination that the prior configuration is not being used.

Another aspect provides a non-transitory computer-readable storage medium storing executable computer program instructions for providing dynamic reconfiguration of a multi-threaded server architecture. The computer program instructions store a plurality of server configurations in a configuration store. Requests, received by the server, are routed to one of a plurality of workers for processing the requests. Each request is associated with a current configuration of the plurality of configurations that a worker uses to process the request. The number of workers using each configuration of the plurality of configurations is counted. Responsive to the counting, it is determined that a prior configuration of the plurality of configurations is not being used by the workers. The prior configuration is deleted from the configuration store responsive to the determination that the prior configuration is not being used.

Still another aspect provides a system for providing dynamic reconfiguration of a multi-threaded server architecture. The system includes a computer processor and a non-transitory computer-readable storage medium storing executable computer program instructions that when executed by the computer processor perform actions including storing a plurality of server configurations in a configuration store. Requests, received by the server, are routed to one of a plurality of workers for processing the requests. Each request is associated with a current configuration of the plurality of configurations that a worker uses to process the request. The number of workers using each configuration of the plurality of configurations is counted. Responsive to the counting, it is determined that a prior configuration of the plurality of configurations is not being used by the workers. The prior configuration is deleted from the configuration store responsive to the determination that the prior configuration is not being used.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a computing environment supporting dynamic server reconfiguration, according to one embodiment.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Computing Environment Supporting Dynamic Server Reconfiguration

Figure 1:
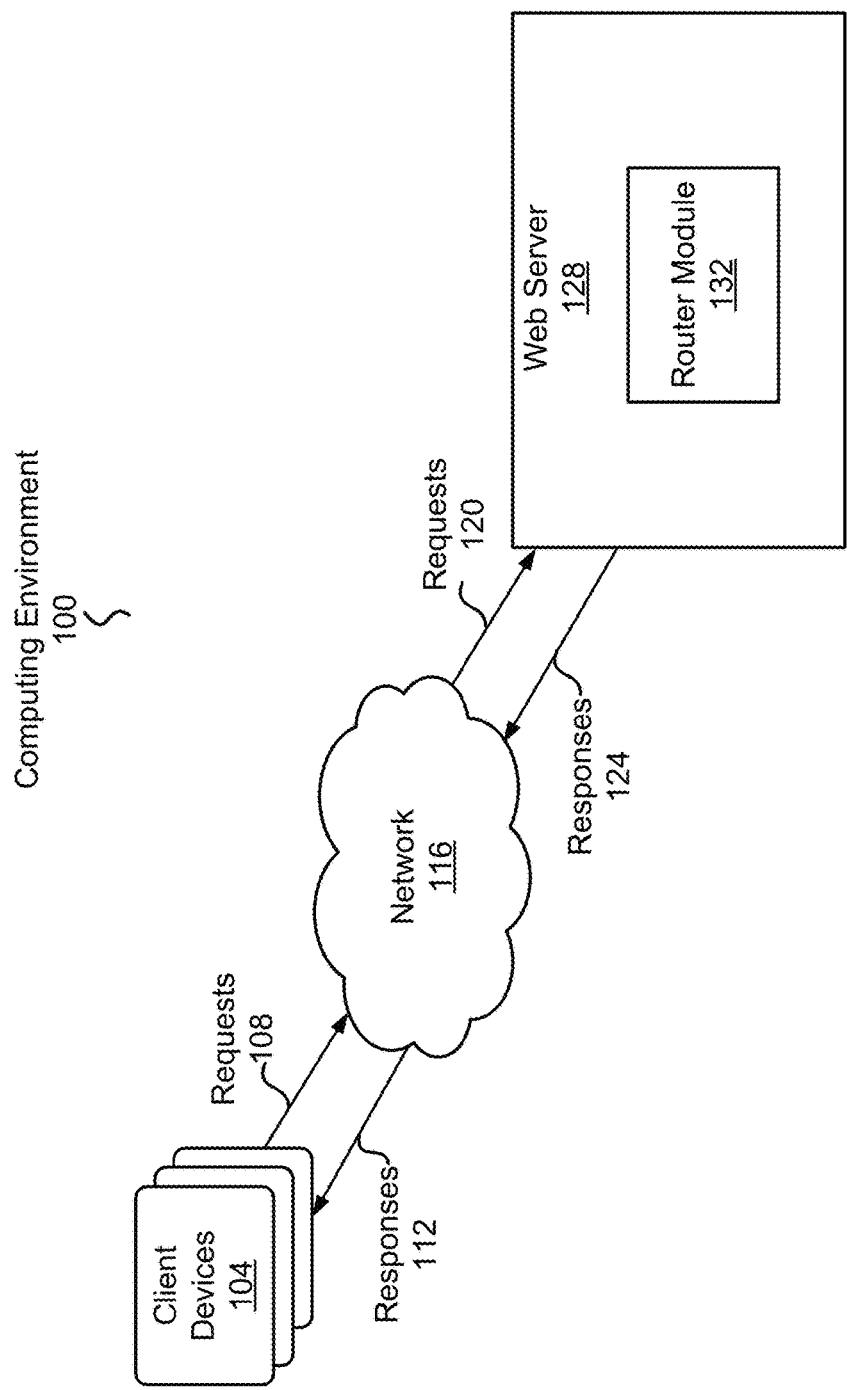

FIG. 1 is a high-level block diagram of a computing environment 100 having a web server 128 supporting dynamic reconfiguration, according to one embodiment. FIG. 1 illustrates multiple client devices 104 and a web server 128 connected by a network 116. While only client devices 104 and one web server are shown in FIG. 1, embodiments of the computing environment 100 can have many such entities connected to the network.

A client device 104 is an electronic device used by a user to perform functions such as consuming digital content, executing software applications, browsing web sites hosted by or otherwise interacting with the web server 128 on the network 116, and downloading files. For example, the client device 104 may be a smartphone or a tablet, notebook, or desktop computer. In addition, the client device 104 may be an Internet-of-Things (IoT)-connected device such as a home appliance, or even another web server. The client device 104 may include a display device on which the user may view digital content stored on the client device 104 or downloaded from the web server 128. In addition, the client device 104 may include a user interface (UI), such as physical and/or on-screen buttons, with which the user may interact to perform functions such as consuming digital content, obtaining digital content, and transmitting digital content.

A client device 104 sends requests 108 to the web server 128 via the network 116. The request 108 seeks to access a resource maintained, controlled, or otherwise accessible by the web server 128. In one embodiment, the client device 104 sends the request 108 using a network protocol, e.g., the Hypertext Transfer Protocol (HTTP) or a secure variant thereof. For example, a web browser on the client device 104 may send a request 108 to the web server 128 to fetch or post a file (e.g., a web page or an image). The request 108 includes information identifying the requested resource and may also include information identifying the content to be posted, the client device 104, the server 128, and the session. For example, the request may include Internet Protocol (IP) addresses and port numbers of the client device 104 and server 128, a path to the requested resource at the server 128, and a cookie identifying the web browsing session.

The network 116 enables communications among the client devices 104 and the web server 128. To this end, the network 116 receives requests 108 and corresponding data (e.g., contents of a file to be posted on a web page) from client devices 104 and forwards the requests 120 to the web server 128. Likewise, the network 116 receives responses 124 from the web server 128 and forwards the responses 112 to the client devices 104.

The network 116 can comprise the Internet as well as mobile telephone networks. In one embodiment, the network 116 uses standard communications technologies and/or protocols. Thus, the network 116 can include links using technologies such as Ethernet, 802.11, Long-Term Evolution (LTE), etc. The networking protocols used on the network 116 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The web server 128 receives and processes requests 120 from the client devices 104 and sends responses 124 back to the requesting client devices 104. As mentioned above, the requests 120 received by the web server 128 are typically request resources. For a given request 120, the web server 128 obtains the requested resource and sends a response 124 providing the resource back to the requesting client device 104. The resource is typically a file or other data, such as a web page or component thereof.

In one embodiment, requests 120 received by the web server 128 are processed by one or more router modules 132. The router module 132 analyzes the requests 120 and routes the requests 120 to one or more worker threads for further processing. Thus, in the web environment the router module 132 serves as a HTTP router within the web server 128. There may be multiple router modules 132 operating concurrently in order to support load balancing and other features.

The router module 132 has a configuration that describes characteristics of the router 132. The configuration is dynamic and can change over time due to actions of a web server 128 administrator or automated processes. For example, the ports on which services are bound may change as the administrator starts and stops various services. The configuration active for a point in time is said to be "current" for that point in time. As the configurations change, current configurations are superseded and become "old" or "prior" configurations.

When the router module 132 receives a request 120, it assigns the request to a worker thread and also provides the thread with a reference to the current router configuration for the request (i.e., the configuration that was current at the time the request was received). The router module 132 may assign multiple requests to a given worker thread, and the requests assigned to the given worker thread may be associated with different router configurations. The worker threads, in turn, process the assigned requests 120 using the requests' associated configurations.

The web server 128 can thus efficiently support dynamic reconfiguration. A given worker thread can simultaneously handle requests having different associated router configurations. There is no need to maintain separate sets of worker threads for different router configurations. As a result, server computing resources are not unduly impacted by configuration changes and the web server 128 can continue to efficiently process requests through dynamic configuration changes.

Multi-Threaded Server Architecture Supporting Dynamic Reconfiguration

Figure 2:
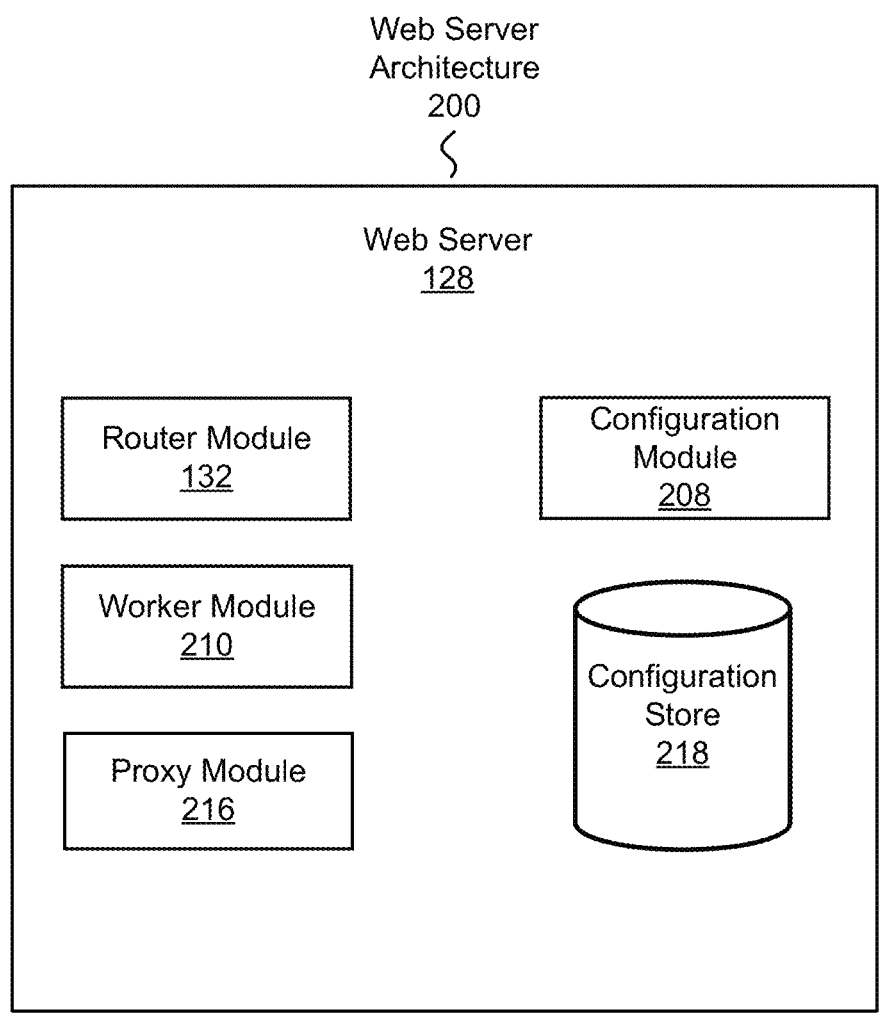
FIG. 2 is a high-level block diagram of a multi-threaded server architecture supporting dynamic reconfiguration, according to one embodiment.

FIG. 2 is a high-level block diagram of a multi-threaded server architecture 200 supporting dynamic reconfiguration according to one embodiment. FIG. 2 illustrates the architecture 200 of the web server 128 of FIG. 1. As shown, the web server 128 includes the router module 132, a configuration module 208, a worker module 210, a proxy module 216, and a configuration store 218. Other embodiments of the web server 128 can have different and/or other modules than the ones described here, and the functionalities can be distributed among the modules in a different manner.

The configuration store 218 stores current and prior configurations used by the router module 132. A configuration describes how various adjustable characteristics of the router module 132 are configured. For example, the configuration may specify the IP addresses, host names, server ports, and/or certificates used by the router module 132. The configuration may be represented as a binary vector (e.g., a string of bits) describing settings for various adjustable characteristics of the router module 132. In addition, the configuration store 218 stores configuration metadata in association with each configuration. In one embodiment, the configuration metadata includes a global counter indicating the number of worker threads using a configuration. The metadata may also describe a window in time in which an associated configuration was current and/or other information about the configuration.

Depending upon the embodiment, the configuration store 218 may be represented by a table in memory of the web server 128, within a relational or flat database, and/or using other techniques. Each configuration is stored in a location in which it can be accessed by other entities within the web server 128. For example, each configuration may be stored at a location specified by a memory pointer, file handle, or other type of reference.

The configuration module 208 maintains the router configuration. In this role, the configuration module 208 maintains the current configuration and detects changes to the configuration. When the configuration changes into a new configuration, the configuration module 208 identifies the new configuration as the current configuration. In one embodiment, the configuration module 208 detects a new configuration by receiving the configuration in an application programming interface (API) call made to the web server 128 using an administrative interface.

The configuration module 208 also maintains the configuration store 218. In one embodiment, the configuration module 208 writes the current configuration to the configuration store 218 and maintains a reference to the current configuration. When the configuration changes, the configuration module 208 writes the new configuration to the configuration store 218 and updates the reference to point to the new configuration. Thus, the configuration module 208 always maintains a reference to the location of the current configuration stored within the configuration store 218. The configuration module 208 also maintains references to prior configurations, and can delete prior configurations from the configuration store 218 in order to free space for storing other configurations. In one embodiment, the configuration module 208 deletes a router configuration from the configuration store 218 if the configuration is not the current configuration and the global counter has a value of zero.

The router module 132, mentioned briefly with respect to FIG. 1, supervises processing of requests from the client devices 104. When an inbound request 120 reaches the web server 128, it is passed to the router module 132. The router module 132 analyzes the request 120 and routes the request 120 to one or more worker threads of the worker module 210. Depending upon the request 120, the router module 132 may render one or more sub-requests responsive to a given inbound request 120 and route these sub-requests to multiple different worker threads. The router module 132 may perform load balancing to distribute requests 120 across the multiple worker threads to increase throughput and reduce latency. The router module 132 may use routing policies to control the flow and assignment of requests. The analysis and routing is dependent upon the current configuration of the router module 132.

The router module 132 also associates each routed request 120 (and/or sub-request) with the reference to the location in the configuration store 210 storing the current configuration at the time the request was processed by the router module 132. Thus, each request routed by the router module 132 to the worker module 210 also includes an associated reference to the configuration to be used when the worker module 210 processes that request.

The router module 132 also receives results (e.g., resources) produced by the worker module 210 in response to the requests. The router module 132 creates outbound responses 124 which it sends to client devices 104 in fulfillment of inbound requests. As part of this processing, the router module 132 may merge multiple sub-responses received from the worker module 210 into a single outbound response.

The worker module 210 represents a pool of worker threads that process the requests 120 received by the router module 132 according to the specified router configurations. In one embodiment, the worker module 210 represents a set of web applications for processing multiple different types of requests. The web applications may be structured as microservices, e.g., a collection of loosely coupled services. The web applications are implemented as a pool of worker threads that process the various types of requests. The worker threads are used to achieve concurrency of processing of the requests by processing many requests simultaneously. The number of worker threads in the pool maintained by the worker module 210 may be tuned to the computing resources available to the web server 128, e.g., parallel processors, cores, memory, and network sockets.

Each worker thread processes a request 120 using the router configuration associated with the request 120. The worker thread uses the reference to the configuration associated with the request 120 to obtain the configuration from the configuration store 218, and then uses the obtained configuration while processing the request 120. Given that a single worker thread may concurrently process multiple requests 120, and different requests 120 may have different associated router configurations, the worker thread may concurrently process different requests 120 using different configurations.

In this manner, dynamic reconfiguration of the web server 128 is attained using the pool of worker threads to simultaneously process different requests 120 using different router configurations. Changing configurations does not require worker threads to be deleted or new worker threads to be created. This technique thus increases web server 128 performance and reduces latency in execution by avoiding frequent creation and destruction of worker threads. Different requests 120 assigned to different configurations in memory and processed by a single worker thread can share the memory space allocated to the worker thread. Further, different requests 120 assigned to different configurations in memory and processed by different worker threads can also share the memory space allocated to the worker module 210. The technique therefore performs processing of web applications more efficiently and reduces resource requirements by assigning each request 120 to a worker thread that lives over the course of more than one request.

The proxy module 216 functions as an intermediary between the worker threads of the worker module 210 and the configuration store 218. The proxy module 216 serves to enable counters relating to how the router configurations in the configuration store 218 are being used. These counters include local counters associated with particular worker threads and the global counters that count the number of worker threads using each particular router configuration.

The proxy module 216 separately interfaces with each worker thread. For a given worker thread, the proxy module 216, maintains a set of local counters. Each local counter in the set is associated with a router configuration being used by at least one request 120 currently being processed by the associated worker thread. A local counter counts the number of requests 120 the worker thread is processing that use that the associated router configuration. For example, assume a worker thread is concurrently processing ten requests 120, where six requests 120 use a first (current) configuration and four requests 120 use a second (prior) configuration. For this thread, the proxy module 216 maintains a local counter for the first configuration having a value of six and a local counter for the second configuration having a value of four.

In one embodiment, the worker threads directly update the associated local counters in the proxy module 216. The worker threads increment the local counters as the threads receive new requests 120 using given router configurations, and decrement the local counters as the threads complete processing requests 120 using given router configurations. Since the proxy module 216 maintains a set of local counters for each worker thread, no race conditions arise because each of the values in each set of local counters is changed by only the associated thread.

In addition, the worker threads update the global counters in the configuration store 218. In embodiments, a worker thread changes the value of a global counter for a router configuration when the thread's local counter for that configuration transitions from zero to one or from one to zero. These transitions indicate that the worker thread has started or stopped using the router configuration, and therefore the global counter, which tracks the number of worker threads using the configuration, should be changed. A global counter, in contrast to a local counter, is subject to race conditions and could become invalid if two local threads simultaneously attempted to change it. Therefore, a worker thread obtains a lock for a global counter before changing the counter's value. The lock prevents two worker threads from changing the global counter at the same time. Alternatively, the changing of a global counter could be implemented using atomic operations without locking.

The worker threads interact with the proxy module 216 using the router configuration references supplied to the worker threads by the router module 132. The reference supplied by router module 132 actually references a location managed by the proxy module 216 instead of a location in the configuration store 218. Thus, when a worker thread follows the reference to obtain the router configuration, it actually references a location in or managed by the proxy module 216. At this location, the proxy module 216 stores a local counter for the worker thread/configuration and a reference to the actual location of the router configuration and associated global counter in the configuration store 218. Thus, the worker thread uses the configuration reference supplied by the router module with the request to access the local counter for the configuration in the proxy module 216, and uses the reference stored in the proxy module 216 to obtain the configuration from the configuration store 218.

In one embodiment, the configuration module 208 maintains the references to the configuration store 218 held by the proxy module 216. As mentioned above, in embodiments, the configuration module 208 may also monitor the global counters in the configuration store 218 and delete non-current configurations having global counter values of zero. This way, the configuration store 218 does not store obsolete configurations, and the web server 128 resources are used efficiently.

Routing Requests to Worker Threads

Figure 3:
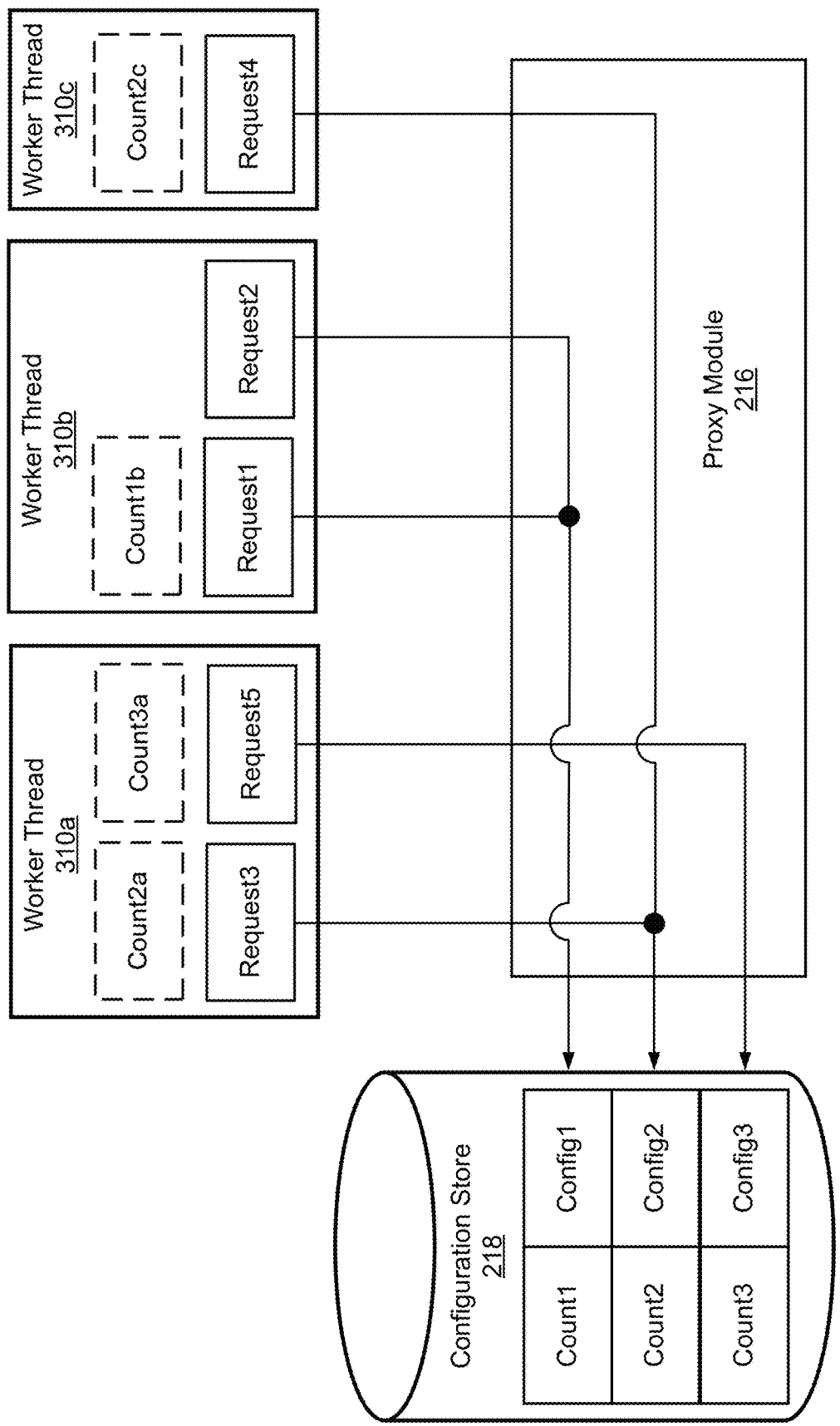
FIG. 3 is a high-level block diagram illustrating routing of requests to worker threads supporting multiple different router configurations according to one embodiment.

FIG. 3 is a high-level block diagram illustrating routing of requests to worker threads supporting multiple different router configurations according to one embodiment. FIG. 3 uses like reference numerals to identify like elements. A letter after a reference numeral, such as "310*a*," indicates that the text refers specifically to the element having that particular reference numeral. A reference numeral in the text without a following letter, such as "310," refers to any or all of the elements in the figures bearing that reference numeral, e.g., "310" in the text refers to reference numerals "310*a*" and/or "310*b*" in the figures.

FIG. 3 illustrates three worker threads 310*a*, 310*b*, and 310*c*, the proxy module 216, and the configuration store 218. Local counters (e.g., Count1*b*) are shown using dashed lines within the associated worker threads 310 for clarity. In one embodiment the local counters are actually maintained within the proxy module 216.

Assume for purposes of FIG. 3 that the router module 132 routes a first request Request1 to worker thread 310*b* for processing. Request1 is associated with router configuration Config1 because this is the current configuration when the request is routed. The local counter Count1*b* corresponding to the worker thread 310*b* and the current configuration Config1 is incremented to one because only one request (Request 1) is assigned to worker thread 310*b* and to configuration Config1. The worker thread 310*b* uses the reference supplied by the router module 132 to reference the proxy module 216, which in turns references configuration Config1 on the configuration store 218 for processing request Request1. The worker thread 310*b* increments the global counter Count1 corresponding to Config1 by one to reflect that a new worker thread 310*b*, which was not processing requests assigned to Config1 earlier, is now processing a request Request1 assigned to Config1.

Assume that a second request Request2 is also assigned to the current configuration Config1 and to worker thread 310*b* for processing. The local counter Count1*b* corresponding to the worker thread 310*b* and the current configuration Config1 is incremented to two because two requests (Request 1 and Request2) are assigned to worker thread 310*b* and to configuration Config1. The worker thread 310*b* references the proxy module 216, which in turn references configuration Config1 on the configuration store 218 for processing request Request2. The global counter Count1 corresponding to Config1 is not incremented because worker thread 310*b* is already processing a request (Request1) assigned to Config1. The count Count1 of worker threads processing requests assigned to configuration Config1 is therefore one.

Now, the current configuration of the web server 128 changes from Config1 to Config2, and configuration Config1 becomes a previous configuration stored by the configuration store 218. When the third request Request3 is received, it is assigned the current configuration Config2 and to worker thread 310*a* for processing. The local counter Count2*a* corresponding to the worker thread 310*a* and the current configuration Config2 is incremented to one because only one request (Request 3) is assigned to worker thread 310*a* and to configuration Config2. The worker thread 310*a* references the proxy module 216, which in turns references configuration Config2 on the configuration store 218 for processing request Request3. The global counter Count2 corresponding to Config2 is incremented to one to reflect that a new worker thread 310*a*, which was not processing requests assigned to Config2 earlier is now processing a request Request3 assigned to Config2.

When request Request4 is received, it is assigned the current configuration Config2 and to worker thread 310*c* for processing. The local counter Count2*c* corresponding to the worker thread 310*c* and the current configuration Config2 is incremented to one because one request (Request4) is assigned to worker thread 310*c* and to configuration Config2. The worker thread 310*c* references the proxy module 216, which in turns references configuration Config2 on the configuration store 218 for processing request Request4. The global counter Count2 corresponding to Config2 is incremented to two to reflect that a new worker thread 310c, which was not processing requests assigned to Config2 earlier is now processing a request Request4 assigned to Config2.

Worker thread 310b completes processing Request1 using configuration Config1. The local counter Count1b corresponding to the worker thread 310b and to configuration Config1 is decremented to one because Request1 has completed and one other request (Request2) is assigned to worker thread 310b is using configuration Config1. The global counter Count1 corresponding to Config1 is not decremented because a worker thread (310b) is still processing requests (Request2) assigned to configuration Config1.

The current configuration of the web server 128 changes from Config2 to Config3, and configuration Config2 becomes a previous configuration stored by the configuration store 218. When the request Request5 is received, it is assigned to the current configuration Config3 and to worker thread 310a for processing. The local counter Count3a corresponding to the worker thread 310a and the current configuration Config3 is incremented to one because only one request (Request 5) assigned to worker thread 310a is using configuration Config3. The worker thread 310a references the proxy module 216, which in turns references configuration Config3 on the configuration store 218 for processing request Request5. The global counter Count3 corresponding to Config3 is incremented to one to reflect that a new worker thread 310a, which was not processing requests assigned to Config3 earlier is now processing a request Request5 assigned to Config3.

The benefits and advantages of the approach are that incoming requests may be assigned to new current configurations while previous requests, assigned to previous configurations, are simultaneously processing without the need for deleting worker threads, creating new worker threads, or delaying new requests until previous requests complete and the web server 128 is reconfigured. Using local counters eliminates lock contention between worker threads while accessing a configuration. Each worker thread is able to process multiple requests assigned to multiple configurations simultaneously, thereby improving the distribution of workloads across multiple computing resources and reducing resource use, increasing throughput, reducing response time, and avoiding the overload of any single resource.

Process for Dynamic Reconfiguration of Multi-Threaded Server Architecture

Figure 4:
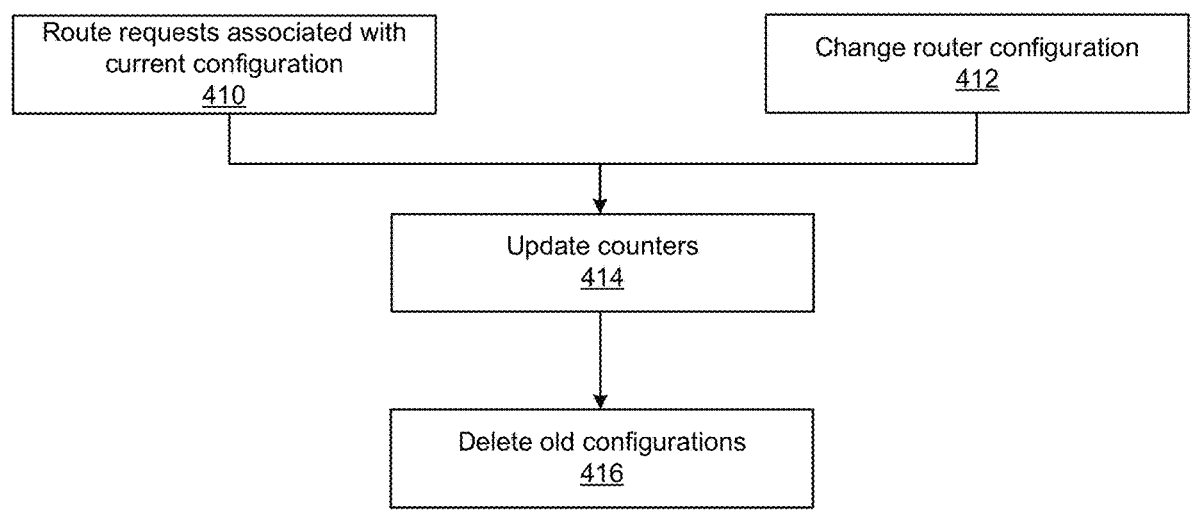
FIG. 4 is a flowchart illustrating steps performed to support dynamic reconfiguration in a multi-threaded server architecture according to one embodiment.

FIG. 4 is a flowchart illustrating steps performed to support dynamic reconfiguration in a multi-threaded server architecture according to one embodiment. FIG. 4 shows certain steps performed by one instance of the web server 128 described in the preceding figures. Other embodiments perform the illustrated steps in different orders, and/or perform different or additional steps.

Assume for purposes of FIG. 4 that the web server 128 is active and a router module 132 within the web server is routing 410 requests 120 from client devices 104. The router module 132 has a current configuration stored in the configuration store 218 with which it associates the routed requests 120. The routed requests 120 are processed by worker threads which use the associated configurations. Concurrently with the request routing 410, the web server 128 monitors 412 for changes to the configuration of the router module 132. For example, the web server 128 monitors for any router configuration changes received via an API of the administrative interface to web server 128. Through this monitoring, the web server detects 412 a change to the configuration of the router module 132. The web server 128 stores 412 the changed configuration in the configuration store 218 as the new current configuration for the router module 132. The web server 128 also continues to store the prior configuration in the configuration store 218. The router module 132 continues to route 410 requests 120 received after the configuration change, and associates these requests 120 with the new current configuration.

The web server 128 updates 414 counters counting usage of the router configurations by the worker threads. Collectively, the worker threads are processing requests using the current configuration and also may be processing requests using prior configurations. The counters include global counters that count the number of worker threads using particular configurations (e.g., the global counter for the current configuration counts the number of different worker threads that are processing at least one request using the current configuration). In addition, the counters include local counters counting the number of requests each worker thread is processing using particular configurations. In one embodiment, each worker thread is associated with its own set of local counters, where the set contains one counter for each configuration being used by the worker thread, and each counter counts the number of requests being processed by the worker thread using a given configuration. The web server 128 updates the global and local counters by appropriately incrementing and decrementing the counters as new requests are routed to the worker threads and the worker threads complete processing of older requests.

The web server 128 deletes 416 prior configurations from the configuration store 218 once the configurations are no longer being used by the worker threads. The web server 128 monitors the global counters for the prior configurations to determine the number of worker threads that are using the configurations. When a global counter for a prior router configuration decrements to zero, this means no worker threads are using the configuration. Therefore, the web server 128 deletes the configuration from the configuration store 218. Deleting the configurations in this way prevents the configuration store 218 from growing unduly large as the router configurations change over time.

Figure 5:
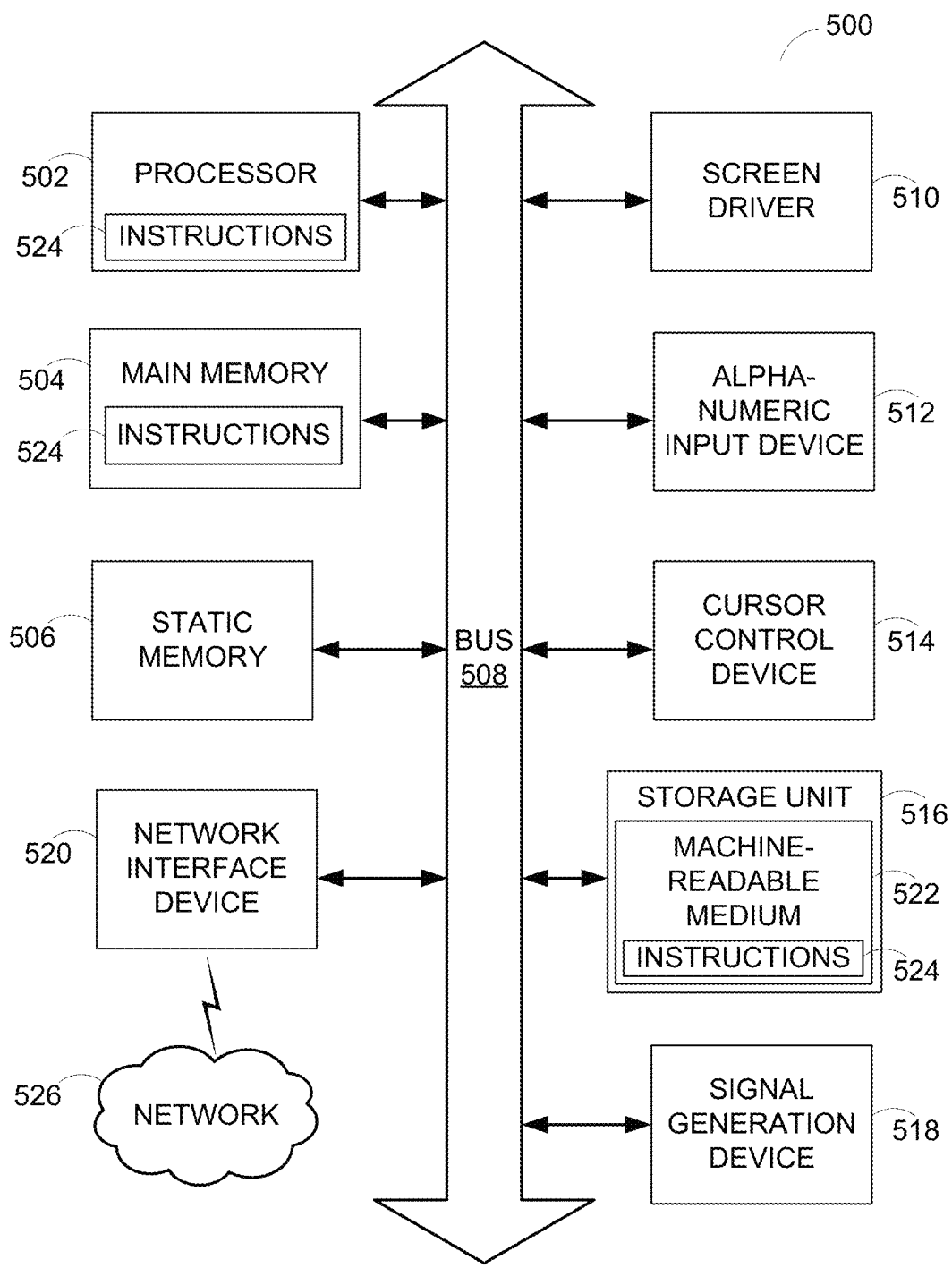
FIG. 5 illustrates components of an example machine able to read instructions to dynamically reconfigure a multi-threaded server architecture from a machine-readable medium and execute them in a processor or controller, according to one embodiment.

Example Machine Providing Dynamic Reconfiguration of Multi-Threaded Server Architecture FIG. 5 illustrates components of an example machine 500 able to read instructions to dynamically reconfigure a multi-threaded server architecture from a machine-readable medium and execute them in a processor or controller, according to one embodiment. Those of skill in the art will recognize that other embodiments of the machine 500 can have different and/or other modules than the ones described here, and that the functionalities can be distributed among the modules in a different manner.

Specifically, FIG. 5 shows a diagrammatic representation of a machine in the example form of a computer system 500. The computer system 500 can be used to execute instructions 524 (e.g., program code modules) that cause the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a cloud server residing on a shared "virtualized" environment managed by a cloud hosting provider, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., program code modules) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any non-transitory medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of dynamically reconfiguring a server, comprising:

storing a plurality of server configurations in a configuration store;

routing requests received by the server to one of a plurality of workers for processing the requests, each request associated with a current configuration of the plurality of configurations that a worker uses to process the request;

counting a number of workers using each configuration of the plurality of configurations;

maintaining a plurality of sets of local counters, each set of local counters being associated with a worker of the plurality of workers, and each local counter in a set is associated with a configuration of the plurality of configurations, wherein each local counter in the set counts a number of requests being processed by the worker using the associated configuration, and wherein the set of local counters associated with the worker are updated by the worker; and determining, responsive to the counting, that a prior configuration of the plurality of configurations is not being used by the workers; and deleting the prior configuration from the configuration store responsive to the determination that the prior configuration is not being used.

2. The computer-implemented method of claim 1, wherein the plurality of configurations comprise a current configuration and one or more prior configurations, and wherein the requests routed to one of the plurality of workers are associated with the current configuration.

3. The computer-implemented method of claim 1, further comprising:

detecting a change to a server configuration used by the server, the change producing a new configuration of the server;

storing the new configuration in the configuration store; and representing the new configuration as the current configuration.

4. The computer-implemented method of claim 1, wherein the routing of the requests comprises:

determining a reference to a location of the current configuration in the configuration store; and providing the reference to the location of the current configuration to a worker to which a request is routed.

5. The computer-implemented method of claim 4, wherein the determining of the reference to the location comprises:

determining a reference to a location at a proxy within the server, the proxy storing the location of the current configuration in the configuration store.

6. The computer-implemented method of claim 1, wherein the counting of the number of the workers comprises:

maintaining a plurality of global counters, each global counter associated with a configuration of the plurality of configurations and counting a number of workers currently processing requests using the configuration;

wherein the plurality of global counters are updated by the number of workers.

7. A non-transitory computer-readable storage medium storing executable computer program instructions for dynamically reconfiguring a server, the computer program instructions comprising instructions which when executed by one or more processors, causes the one or more processors to:

store a plurality of server configurations in a configuration store;

route requests received by the server to one of a plurality of workers for processing the requests, each request associated with a current configuration of the plurality of configurations that a worker uses to process the request;

count a number of workers using each configuration of the plurality of configurations;

maintain a plurality of sets of local counters, each set of local counters being associated with a worker of the plurality of workers, and each local counter in a set is associated with a configuration of the plurality of configurations, wherein each local counter in the set counts a number of requests being processed by the worker using the associated configuration, and wherein the set of local counters associated with the worker are updated by the worker; and determine, responsive to the counting, that a prior configuration of the plurality of configurations is not being used by the workers; and delete the prior configuration from the configuration store responsive to the determination that the prior configuration is not being used.

8. The non-transitory computer-readable storage medium of claim 7, wherein the plurality of configurations comprise a current configuration and one or more prior configurations, and wherein the requests routed to one of the plurality of workers are associated with the current configuration.

9. The non-transitory computer-readable storage medium of claim 7, further comprising instructions which when executed by one or more processors, causes the one or more processors to:

detect a change to a server configuration used by the server, the change producing a new configuration of the server;

store the new configuration in the configuration store; and representing the new configuration as the current configuration.

10. The non-transitory computer-readable storage medium of claim 7, wherein the routing of the requests comprises:

determining a reference to a location of the current configuration in the configuration store; and providing the reference to the location of the current configuration to a worker to which a request is routed.

11. The non-transitory computer-readable storage medium of claim 10, wherein the determining of the reference to the location comprises:

determining a reference to a location at a proxy within the server, the proxy storing the location of the current configuration in the configuration store.

12. The non-transitory computer-readable storage medium of claim 7, wherein the counting of the number of the workers comprises:

maintaining a plurality of global counters, each global counter associated with a configuration of the plurality of configurations and counting a number of workers currently processing requests using the configuration;

wherein the plurality of global counters are updated by the number of workers.

13. A computer system comprising:
a computer processor; and a non-transitory computer-readable storage medium storing executable computer program instructions that when executed by the computer processor perform actions comprising:

storing a plurality of server configurations in a configuration store;

routing requests received by the server to one of a plurality of workers for processing the requests, each request associated with a current configuration of the plurality of configurations that a worker uses to process the request;

counting a number of workers using each configuration of the plurality of configurations;

maintaining a plurality of sets of local counters, each set of local counters being associated with a worker of the plurality of workers, and each local counter in a set is associated with a configuration of the plurality of configurations, wherein each local counter in the set counts a number of requests being processed by the worker using the associated configuration, and wherein the set of local counters associated with the worker are updated by the worker; and determining, responsive to the counting, that a prior configuration of the plurality of configurations is not being used by the workers; and deleting the prior configuration from the configuration store responsive to the determination that the prior configuration is not being used.

14. The computer system of claim 13, wherein the plurality of configurations comprise a current configuration and one or more prior configurations, and wherein the requests routed to one of the plurality of workers are associated with the current configuration.

15. The computer system of claim 13, further comprising executable computer program instructions that when executed by the computer processor perform actions comprising:

detecting a change to a server configuration used by the server, the change producing a new configuration of the server;

storing the new configuration in the configuration store; and representing the new configuration as the current configuration.

16. The computer system of claim 13, wherein the routing of the requests comprises:

determining a reference to a location of the current configuration in the configuration store; and providing the reference to the location of the current configuration to a worker to which a request is routed.

17. The computer system of claim 16, wherein the determining of the reference to the location comprises:

determining a reference to a location at a proxy within the server, the proxy storing the location of the current configuration in the configuration store.

18. The computer system of claim 13, wherein the counting of the number of the workers comprises:

maintaining a plurality of global counters, each global counter associated with a configuration of the plurality of configurations and counting a number of workers currently processing requests using the configuration;

wherein the plurality of global counters are updated by the number of workers.

* * * * *